(12) United States Patent
Venkataraman et al.

(10) Patent No.: US 11,170,009 B2
(45) Date of Patent: Nov. 9, 2021

(54) SYSTEM AND A METHOD FOR RESOURCE DATA CLASSIFICATION AND MANAGEMENT

(71) Applicant: Cognizant Technology Solutions India Pvt. Ltd., Chennai (IN)

(72) Inventors: Swaminath Venkataraman, Chennai (IN); Dinesh Suresh, Chennai (IN); Karthik Rajagopal, Chennai (IN); Girivas Vaidyanathan, Chennai (IN); Anand Kabra, Hyderabad (IN); Arunava Bhattacharjee, Kolkata (IN); Ramesh Srinivasan, Chennai (IN); Shreshth Raitani, Mumbai (IN); Suresh Ramanathan Aylur, Chennai (IN); Ankit Sharma, Madhya Pradesh (IN); Giridhar Sampathkumar, Kanchipuram (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 62 days.

(21) Appl. No.: 16/751,572

(22) Filed: Jan. 24, 2020

(65) Prior Publication Data
US 2021/0124748 A1  Apr. 29, 2021

(30) Foreign Application Priority Data
Oct. 23, 2019 (IN) .............................. 201941042990

(51) Int. Cl.
*G06F 16/2457* (2019.01)
*G06F 16/23* (2019.01)

(52) U.S. Cl.
CPC .... *G06F 16/24578* (2019.01); *G06F 16/2379* (2019.01)

(58) Field of Classification Search
CPC ....................... G06F 16/24578; G06F 16/2379
See application file for complete search history.

(56) References Cited

U.S. PATENT DOCUMENTS 6,049,446 A   4/2000  Ha
6,275,812 B1  8/2001  Haq
(Continued)

OTHER PUBLICATIONS

Netsuite Openair Resource Management; http://www.netsuite.com/portal/assets/pdf/ds-resource-management.pdf, NetSuite 2016.

*Primary Examiner* — Jay A Morrison
(74) *Attorney, Agent, or Firm* — Cantor Colburn LLP

(57) ABSTRACT

The present invention discloses a system and a method for resource data classification and management. In operation, the present invention provides for evaluating a deployment probability score for each incoming data-record based on previous data-records. Further, a match score of each incoming data-record is computed. Furthermore, each incoming data-record is analyzed to determine a bench period associated with each incoming data-record. Yet further, the present invention, categorizes the incoming data-records into two or more categories based on corresponding deployment probability score, match score and bench period. A deployment opportunity index is generated for each incoming data-record representing the categories and corresponding probability score, match score and bench period, providing an upfront indication of deploy-ability of an incoming data-record. Finally, the present invention provides for generating a list of recommendations for each data-record.

19 Claims, 3 Drawing Sheets

(56) References Cited

U.S. PATENT DOCUMENTS

| | | |
|---|---|---|
| 2017/0316080 A1 | 11/2017 | Brisebois |
| 2018/0012186 A1* | 1/2018 | Baker, IV .......... G06Q 10/1053 |
| 2019/0066056 A1 | 2/2019 | Gomez |
| 2020/0202303 A1* | 6/2020 | Zhang .................. H04L 67/306 |
| 2021/0081900 A1* | 3/2021 | Wang ....................... G06N 5/04 |

* cited by examiner

SYSTEM AND A METHOD FOR RESOURCE DATA CLASSIFICATION AND MANAGEMENT

CROSS REFERENCE TO RELATED APPLICATION

This application is related to and claims the benefit of Indian Patent Application Number 201941042990 filed on Oct. 23, 2019, the contents of which are herein incorporated by reference in their entirety.

FIELD OF THE INVENTION

The present invention relates generally to the field of data science and analytics. More particularly, the present invention relates to a system and a method for classifying and managing resource data based on computation of deployment probability score.

BACKGROUND OF THE INVENTION

In modern industries, resource planning and development is an essentiality to sustain in the competitive market. While several resources such as employees are readily available in market for one or more roles offered by any organization practicing in any particular industry, giving due importance to the resources currently available with the organization is the key towards organizational growth, good work environment and effective management. In order to effectively manage resources such as employees, most of the modern organizations maintain resource data in a resource database. The resource data comprises a plurality of data records comprising details of each resource in the organization's deployment pool. Especially in rapidly moving industries such as Information. and technology (IT) industries, each resource data-record is frequently updated with various parameters associated with the resources which may include, but are not limited to, skills, current role, location, performance data, bench period etc. Organizations rely on their databases at least for resource planning and skill development of resources. However, manual processing of the resource data maintained in the database for further utilization such as optimized resource planning and organizational development is a complex, time consuming and humongous task. Further, inefficient management of resource data increases processing time, storage requirements as well as organizational cost. Therefore, effective utilization of resource data requires enhanced data analysis and classification for easing accessibility, reducing processing time and storage requirements.

In light of the above drawbacks, there is a need for a system and a method for resource data classification and management. There is need for a system and method which performs a detailed analysis of data-records associated with each resource to predict the deployment probability of the data record, leading to effective resource utilization and planning. Further, there is need for a system and a method which can be implemented with existing resource management systems. Furthermore, there is a need for a system and a method which is easy to implement and cost effective.

SUMMARY OF THE INVENTION

In various embodiments of the present invention, a method for resource data classification and management is provided. The method is implemented by at least one processor executing program instructions stored in a memory. The method comprises evaluating deployment probability scores of a plurality of incoming data-records. The method further comprises computing a match score of the plurality of incoming data-records in relation to one or more vacancy records, where each of the plurality of incoming data-record and the one or more vacancy records are analysed using a first set of rules. Further, the method comprises determining a bench period associated with each of the plurality of incoming data-record. The bench period is a period for which the incoming data-record is set to hold. Furthermore, the method comprises categorizing the plurality of incoming data-records based on corresponding evaluated deployment probability score, the match score and the bench period for generating a deployment opportunity index for managing resource data.

In various embodiments of the present invention, a system for resource data classification and management is provided. The system comprises a memory storing program instructions, a processor configured to execute program instructions stored in the memory, and deployment opportunity evaluation engine in communication with the processor. The system is configured to evaluate deployment probability scores of a plurality of incoming data-records. Further, the system is configured to compute a match score of the plurality of incoming data-records in relation to one or more vacancy records, where each of the plurality of incoming data-record and the one or more vacancy records are analysed using a first set of rules. Furthermore, the system is configured to determine a bench period associated with each of the plurality of incoming data-record. The bench period is a period for which the incoming data-record is set to hold. Yet further, the system is configured to categorize the plurality of incoming data-records based on corresponding evaluated deployment probability score, the match score and the bench period for generating a deployment opportunity index for managing resource data.

In various embodiments of the present invention, a computer program product is provided. The computer program product comprises a non-transitory computer-readable medium having computer-readable program code stored thereon, the computer-readable program code comprising instructions that, when executed by a processor, cause the processor to evaluate deployment probability scores of a plurality of incoming data-records. Further, a match score of the plurality of incoming data-records is computed in relation to one or more vacancy records, where each of the plurality of incoming data-record and the one or more vacancy records are analysed using a first set of rules. Furthermore, a bench period associated with each of the plurality of incoming data-record is determined. The bench period is a period for which the incoming data-record is set to hold. Yet further, the plurality of incoming data-records are categorized based on corresponding evaluated deployment probability score, the match score and the bench period for generating a deployment opportunity index for managing resource data.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

Figure 1:
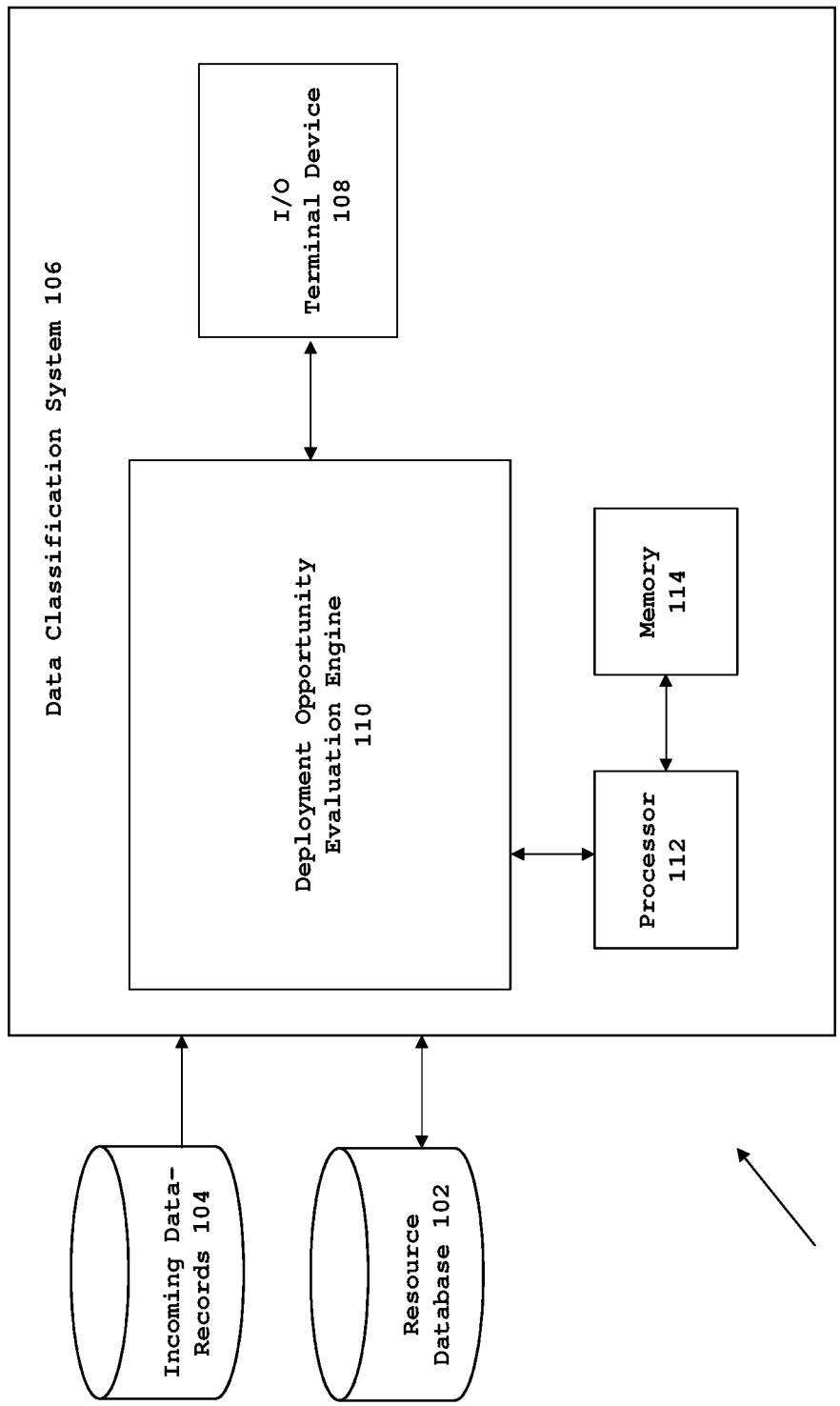
FIG. 1 illustrates a detailed block diagram of a system for resource data classification and management, in accordance with an embodiment of the present invention.

The present invention discloses a system and a method for resource data classification and management. In particular, the present invention provides for categorizing resource data comprising a plurality of data-records based on computation of a deployment probability score, match score and bench period of respective data-records. In operation, the present invention provides for evaluating a deployment probability score for each resource data-record entering the organization's deployment pool (hereinafter referred to as incoming data-record) based on previous data-records maintained in a resource database throughout a predefined period of time. The present invention further provides for computing a match score of each incoming data-record, where match score is representative of the acceptability of respective incoming data-records for on one or more vacancies in the organization. Further, the present invention provides for analysis of each incoming data-record to determine a bench period associated with each incoming data-record. Bench period is the period for which an incoming data-record is set to hold due to unavailability of vacancy, lack of skills, self-upskilling etc. Furthermore, the present invention, categorizes the incoming data-records into two or more categories based on corresponding deployment probability score, match score and bench period. A deployment opportunity index is generated for each incoming data-record representing the categories and corresponding probability score, match score and bench period, providing an upfront indication of deploy-ability of an incoming data-record. Yet further, a list of recommendations are generated for each data-record. Yet further, the present invention provides for updating the generated deployment opportunity index based on a change in bench period.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention. It is to be noted that the terms "classification" and "categorization" have been used interchangeably in the specification. In various embodiments of the present invention, the term "organization's deployment pool" refers to the list of resources available with the organisation for deployment.

The present invention would now be discussed in context of embodiments as illustrated in the accompanying drawings.

FIG. 1 illustrates a detailed block diagram of a system for resource data classification and management, in accordance with an embodiment of the present invention. Referring to FIG. 1, in an embodiment of the present invention, illustrated is an environment 100 which comprises a resource database 102, incoming data-records 104 and a system for resource data classification and management hereinafter referred to as a data classification system 106.

In various embodiments of the present invention, the resource database 102 is a database comprising a plurality of previously stored data-records throughout a desired time-duration. The previously stored data-records are associated with previous resources in the organization's deployment pool. Each data-record comprises resource details related to a plurality of parameters. In an exemplary embodiment of the present invention, where the resource is an employee, the plurality of parameters may include, but are not limited to name, grade, location, region, latest rating, previous year rating, rating prior to previous year, time since last promotion, bench period in one or more years, utilization in current role, utilization in previous role, billability status, previous role type, technical skills, historical median time taken to fit a vacancy record, current demand for existing data record. In an embodiment of the present invention, the resource database 102 may be maintained in a server computer of the organization or a third-party server. In another embodiment of the present invention, the resource database 102 may be an integral part of the data classification system 104.

In an embodiment of the present invention, the incoming data-records 104 are associated with resources such as employees which are entering the organization's deployment pool. The incoming data-records 104 may be associated with newly recruited employees as well previously recruited employee existing in the organization's deployment pool. Each incoming data-record 104 comprises resource details related to a plurality of parameters. In an exemplary embodiment of the present invention, the plurality of parameters may include, but are not limited to name, grade, location, region, latest rating, previous year rating, rating prior to previous year, time since last promotion, bench period in one or more years, utilization in current role, utilization in previous role, billability status, previous role type, technical skills, historical median time taken to fit a vacancy record, current demand for existing data record. The plurality of parameters are selected such as to include information associated with at least demographics, performance history, and utilization history of the resource. In an embodiment of the present invention, the incoming data-records 104 may be stored in a database storage separate from the resource database 102. In another embodiment of the present invention, the incoming data-records may be maintained in a resource management system (not shown).

In various embodiments of the present invention, the data classification system 106 may be a hardware, a software or a combination of hardware and software. In an embodiment of the present invention, as shown in FIG. 1, the data classification system is a combination of hardware and a software. The data classification system 106 interfaces with the resource database 102 to retrieve previously stored data-records. In an embodiment of the present invention, the data classification system 106 interfaces with the resource database 102 over a communication channel (not shown). Examples of the communication channel (not shown) may include, but are not limited to, a software interface, physical transmission medium, such as, a wire, or a logical connection over a multiplexed medium, such as, a radio channel in telecommunications and computer networking. Examples of radio channel in telecommunications and computer networking may include, but are not limited to a Local Area Network (LAN), a Metropolitan Area Network (MAN), and a Wide Area Network (WAN). Further, the data classification system 106 is configured to receive incoming data-records over another communication channel (not shown). In an exemplary embodiment of the present invention, the incoming data-records 104 may be received from a resource management system (not shown).

In another embodiment of the present invention, the data classification system 106 may be implemented in a cloud computing architecture in which data, applications, services, and other resources are stored and delivered through shared data-centers. In an exemplary embodiment of the present invention, the functionalities of the data classification system 106 are delivered to a client computing device as software as a service (SAAS). In another embodiment of the present invention, the data classification system 106 may be implemented as a client-server architecture, where the client computing device accesses a server hosting the data classification system 106 over a communication channel.

In various embodiments of the present invention, the data classification system 106 comprises an input/output (I/O) terminal device 108, a deployment opportunity evaluation engine 110, a processor 112 and a memory 114. The deployment opportunity evaluation engine 110 is operated via the processor 112 specifically programmed to execute instructions stored in the memory 114 for executing various functionalities of the engine 110 in accordance with various embodiments of the present invention. Examples the input/output (I/O) terminal device 108 may include, but is not limited to, a touchscreen display, a keyboard and a display combination or any other wired or wireless device capable of receiving inputs and displaying output results.

In various embodiments of the present invention, the deployment opportunity evaluation engine 110 is a self-learning engine configured to receive complex resource data, analyze and process resource data to develop a tool for evaluating deployment probability score, compute a match score of each data-record, determine bench period associated with each data record, and classify data-records to generate a deployment opportunity index.

In an embodiment of the present invention, the deployment opportunity evaluation engine 110, is configured to develop a tool for evaluating a deployment probability score for each incoming data-record 104 entering the organization's deployment pool. In particular, the deployment opportunity evaluation engine 110 receives a plurality of previous data-records from the resource database 102, where the previous data-records are maintained throughout a pre-defined duration of time. In an exemplary embodiment of the present invention, the predefined duration may be previous 1 year record. As already stated earlier each previous data-record comprises resource details related to a plurality of parameters. In an exemplary embodiment of the present invention, the plurality of parameters may include, but are not limited to name, grade, location, region, latest rating, previous year rating, rating prior to previous year, time since last promotion, bench period in one or more years, utilization in current role, utilization in previous role, billability status, previous role type, technical skills, historical median time taken to fit a vacancy record, current demand for existing data record. The plurality of parameters are selected such as to include information associated with at least demographics, performance history, and utilization history of the resource. The deployment opportunity evaluation engine 110, creates one or more rules to analyze and extract information, and evaluate a deployment probability score of the incoming data-records 104 based on the received previous data-records using one or more machine learning techniques. In an exemplary embodiment of the present invention, the one or more machine learning techniques may include, but are not limited to, extreme gradient boosting technique.

The deployment opportunity evaluation engine 110 is further configured to evaluate deployment probability scores of respective incoming data-records 104 received from a resource management system (not shown) via the developed tool.

In an embodiment of the present invention, the deployment opportunity evaluation engine 110 is configured to receive one or more vacancy records associated with existing vacancy/vacancies in the organization. In an exemplary embodiment of the present invention, each vacancy record comprises information associated with job role such as technical skills, grade, location, region etc. In various embodiment of the present invention, the one or more vacancy records may be received from a vacancy database (not shown). In an exemplary embodiment of the present invention, the one or more vacancy records may be received from the resource management system (not shown). The deployment opportunity evaluation engine 110 analyses each incoming data-record 104 and the one or more vacancy records using a first set of rules to compute a match score of respective incoming data-records 104 in relation to one or more vacancy records. In an embodiment of the present invention, a match score is representative of acceptability of respective incoming data-records 104 for one or more vacancy records associated with corresponding vacancies in the organization. In an exemplary embodiment of the present invention, a match score is representative of acceptability of respective incoming data-records for one or more vacancy records associated with corresponding vacancies in a specific unit of an organization. In an exemplary embodiment of the present invention, the first set of rules comprises computing a percentage of commonality between each incoming data-record 104 and the one or more vacancy record. The percentage of commonality is computed by determining and analyzing skills that are common in the incoming data-record 104 and the vacancy record. The first set of rules further comprises computing proficiency in the determined common skills for the incoming data-records 104. Further, the first set of rules comprises computing skill adjacency between each incoming data-record 104 and the one or more vacancy record. The skill adjacency is computed by determining similarity between skills of incoming data-record 104 and the vacancy record. Furthermore, the first set of rules comprises mapping location, grade and region details of the incoming data-record 104 with vacancy data record. Finally, a match score is computed based on percentage of commonality, proficiency, skill adjacency, along with location, grade and region details. The incoming data-record 104 having a better combination of percentage of commonality, proficiency, skill adjacency, location, grade and region details is provided a high match score. In another embodiment of the present invention, the deployment opportunity evaluation engine 110 is configured to receive match score of each data-record from a third party server. Examples of third party server may include, but are not limited to talent market place portal.

The deployment opportunity evaluation engine 110 is further configured to process each data-record to determine a bench period associated with each data-record. In various embodiments of the present invention, a bench period is a period for which an data-record is set to hold due to unavailability of vacancy, lack of skills, etc.

The deployment opportunity evaluation engine 110 further classifies each of the incoming data-records 104 into two or more categories based on corresponding deployment probability score, match score and bench period. In an exemplary embodiment of the present invention, the deployment opportunity evaluation engine 110 is configured to categorize the incoming data records 104 into four categories. In an exemplary embodiment of the present invention, the incoming data-records 104 having a high deployment probability score, a match score of more than 70% and a bench period ranging between 0-29 days are categorized as easily deployable incoming data-records. Further, the incoming data-records 104 having a high deployment probability score, a match score of 40-70% and a bench period ranging between 0-29 days are categorized as moderately deployable data-records. Similarly, the data-records having a low deployment probability score, a match score of 40-70% and a bench period ranging between 0-29 days are categorized as the data-records requiring reskilling or upskilling. Finally, the incoming data-records 104 having a low deployment probability score, a match score of less than 40% and a bench period ranging between 0-29 days are categorized as data-records requiring reskilling intervention.

Further, the deployment opportunity evaluation engine 110 generates a deployment opportunity index for each incoming data-record. The deployment opportunity index represents the categories and corresponding probability score, match score and bench period associated with each data-record. The deployment opportunity evaluation engine 110 is configured to update the generated deployment opportunity index based on a change in bench period.

Table 1 below shows a deployment opportunity index, where the incoming data-records 104 are categorized into four categories based on corresponding deployment probability score, match score and bench period. In the table the match score is computed for respective incoming data-records 104 for a vacancy record associated with a vacancy in the same unit of an organization as the data-record and different unit of the organization as the data-record. The data-records are categorized based on match scores evaluated for vacancy record in the same unit and vacancy records in different unit.

TABLE 1

| Deployment Opportunity Score | Match Score | | Bench Period | |
|---|---|---|---|---|
| | For vacancy record in the Same unit | For a vacancy record Different Unit | 0-29 days | 30 days or more |
| High | >70% | >70% | CATEGORY 4 | CATEGORY 3 |
| High | >70% | 40-70% | CATEGORY 4 | CATEGORY 3 |
| High | >70% | <40% | CATEGORY 4 | CATEGORY 3 |
| High | 40-70% | >70% | CATEGORY 4 | CATEGORY 3 |
| High | 40-70% | 40-70% | CATEGORY 3 | CATEGORY 2 |
| High | 40-70% | <40% | CATEGORY 3 | CATEGORY 2 |
| High | <40% | >70% | CATEGORY 4 | CATEGORY 3 |
| High | <40% | 40-70% | CATEGORY 3 | CATEGORY 2 |
| High | <40% | <40% | CATEGORY 2 | CATEGORY 1 |
| Low | >70% | >70% | CATEGORY 3 | CATEGORY 2 |
| Low | >70% | 40-70% | CATEGORY 3 | CATEGORY 2 |
| Low | >70% | <40% | CATEGORY 3 | CATEGORY 2 |
| Low | 40-70% | >70% | CATEGORY 3 | CATEGORY 2 |
| Low | 40-70% | 40-70% | CATEGORY 2 | CATEGORY 1 |
| Low | 40-70% | <40% | CATEGORY 2 | CATEGORY 1 |

TABLE 1-continued

| Deployment Opportunity Score | Match Score | | Bench Period | |
|---|---|---|---|---|
| | For vacancy record in the Same unit | For a vacancy record Different Unit | 0-29 days | 30 days or more |
| Low | <40% | >70% | CATEGORY 2 | CATEGORY 1 |
| Low | <40% | 40-70% | CATEGORY 2 | CATEGORY 1 |
| Low | <40% | <40% | CATEGORY 1 | — |

The deployment opportunity evaluation engine 110, finally generates a list of recommendations for each incoming data-record 104 based on the corresponding category and displays said recommendations via the input/output terminal device 108.

Advantageously, the resource data categorization of the present invention provides an upfront indication of deployability of an incoming data-record 104, which further helps in proactive planning and better management of incoming data-records 104 associated with excessive bench periods. Additionally, the categorization helps in adopting skilling initiatives for appropriate data-records.

Figure 2:
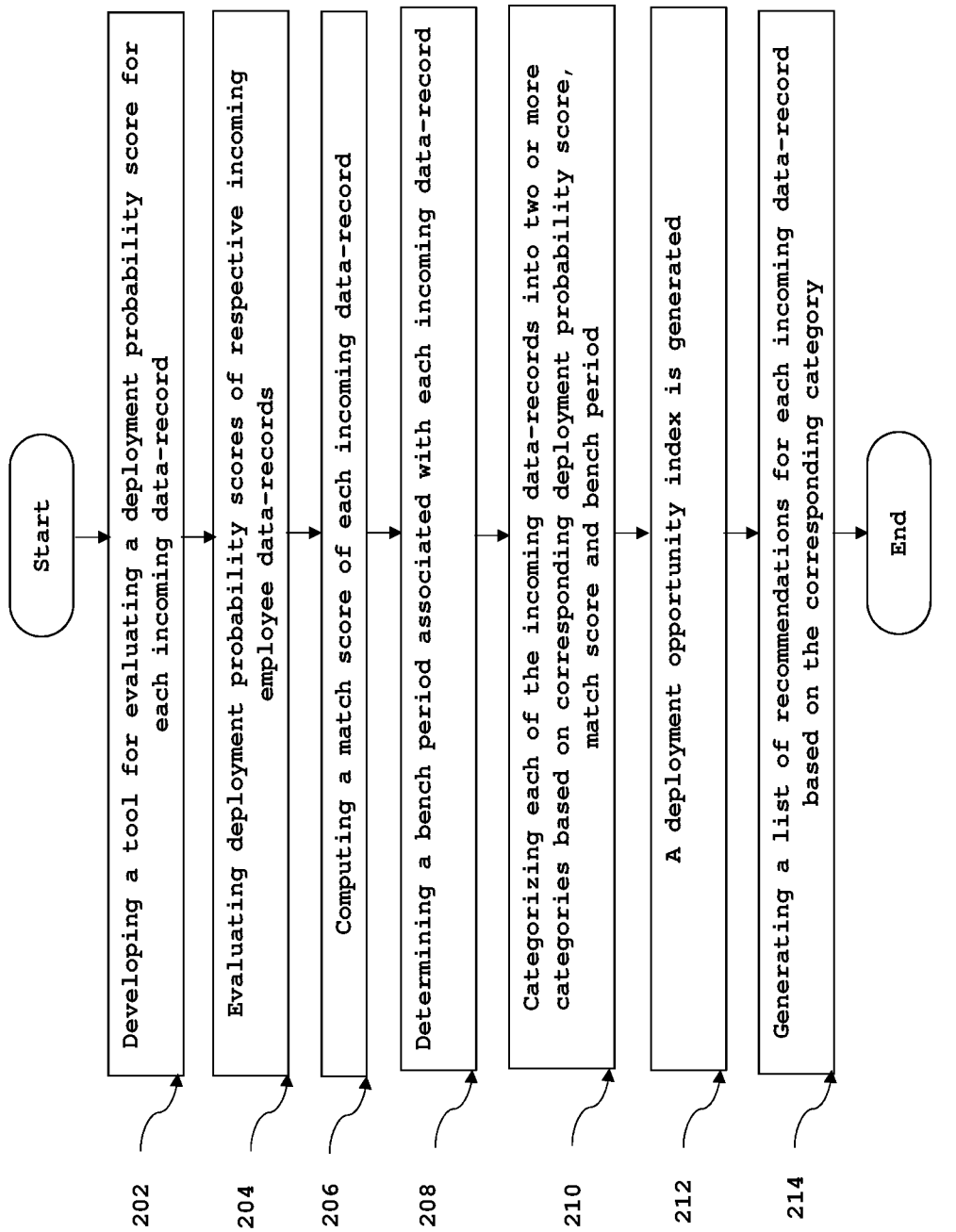
FIG. 2 is a flowchart illustrating a method for resource data classification and management, in accordance with various embodiments of the present invention.

FIG. 2 is a flowchart illustrating a method for resource data classification and management, in accordance with various embodiments of the present invention.

At step 202, a tool for evaluating a deployment probability score for each incoming data-record is developed. In an embodiment of the present invention, a plurality of previous data-records maintained throughout a predefined duration of time are received from a resource database (102 of FIG. 1). In an exemplary embodiment of the present invention, the predefined duration may be previous 1 year record. Each previous data-record comprises resource details related to a plurality of parameters. In an exemplary embodiment of the present invention, the plurality of parameters may include, but are not limited to name, grade, location, region, latest rating, previous year rating, rating prior to previous year, time since last promotion, bench period in one or more years, utilization in current role, utilization in previous role, billability status, previous role type, technical skills, historical median time taken to fit a vacancy record, current demand for existing data record. The plurality of parameters are selected such as to include information associated with at least demographics, performance history, and utilization history of the resource. One or more rules to analyze and extract information from the incoming data-record and evaluate a deployment probability score are created based on the received previous data-records using one or more machine learning techniques. In an exemplary embodiment of the present invention, the one or more machine learning techniques may include, but are not limited to, extreme gradient boosting technique.

At step 204, deployment probability scores of respective incoming data-records are evaluated. The deployment probability scores of respective incoming data-records 104 received from a resource management system (not shown) are evaluated via the developed tool.

At step 206, a match score of each incoming data-record is computed. In an embodiment of the present invention, one or more vacancy records associated with existing vacancy/vacancies in the organization are retrieved. In an exemplary embodiment of the present invention, each vacancy record comprises information associated with job role such as technical skills, grade, location, region etc. In various embodiments of the present invention, the one or more vacancy records may be retrieved from a vacancy database (not shown). In an exemplary embodiment of the present invention, the one or more vacancy records may be retrieved from the resource management system (not shown). Each incoming data-record and the one or more vacancy records are analyzed using a first set of rules to compute a match score of respective data-records in relation to one or more vacancy records. In an embodiment of the present invention, a match score is representative of acceptability of respective data-records for one or more vacancy records associated with corresponding vacancies in the organization. In an exemplary embodiment of the present invention, a match score is representative of acceptability of respective incoming data-records for one or more vacancy records associated with corresponding vacancies in a specific unit of an organization. In an exemplary embodiment of the present invention, the first set of rules comprises computing a percentage of commonality between each incoming data-record and the one or more vacancy record. The percentage of commonality is computed by determining and analyzing skills that are common in the incoming data-record and the vacancy record. The first set of rules further comprises computing proficiency in the determined common skills for the incoming data-records. Further, the first set of rules comprises computing skill adjacency between each incoming data-record and the one or more vacancy record. The skill adjacency is computed by determining similarity between skills of incoming data-record and the vacancy record. Furthermore, the first set of rules comprises mapping location, grade and region details of the incoming data-record with vacancy data record. Finally, a match score is computed based on percentage of commonality, proficiency, skill adjacency, along with location, grade and region details. The incoming data-record having a better combination of percentage of commonality, proficiency, skill adjacency, location, grade and region details is provided a high match score.

In another embodiment of the present invention, a match score of each data-record is retrieved from a third party server. Examples of third party server may include, but are not limited to talent market place portal.

At step 208, a bench period associated with each incoming data-record is determined. In particular, each data-record is processed to determine a bench period associated with each data-record. In various embodiments of the present invention, a bench period is a period for which an data-record is set to hold due to unavailability of vacancy records, lack of skills, etc.

At step 210, each of the incoming data-records are categorized into two or more categories based on corresponding deployment probability score, match score and bench period. In an exemplary embodiment of the present invention, the incoming data records are categorized into four categories. In an exemplary embodiment of the present invention, the data-records having a high deployment probability score, a match score of more than 70% and a bench period ranging between 0-29 days are categorized as easily deployable incoming data-records. Further, the incoming data-records having a high deployment probability score, a match score of 40-70% and a bench period ranging between 0-29 days are categorized as moderately deployable data-records. Similarly, the data-records having a low deployment probability score, a match score of 40-70% and a bench period ranging between 0-29 days are categorized as the data-records requiring reskilling or upskilling. Finally, the data-records having a low deployment probability score, a match score of less than 40% and a bench period ranging between 0-29 days are categorized as data-records requiring reskilling intervention.

At step 212, a deployment opportunity index is generated. In an embodiment of the present invention, a deployment opportunity index, as shown in Table 1 is generated for each incoming data-record. The deployment opportunity index represents the categories and corresponding probability score, match score and bench period associated with each incoming data-record for effective management of resource data. At step 214, a list of recommendations for each data-record is generated based on the corresponding category and displays said recommendations via an input/output terminal device.

Figure 3:
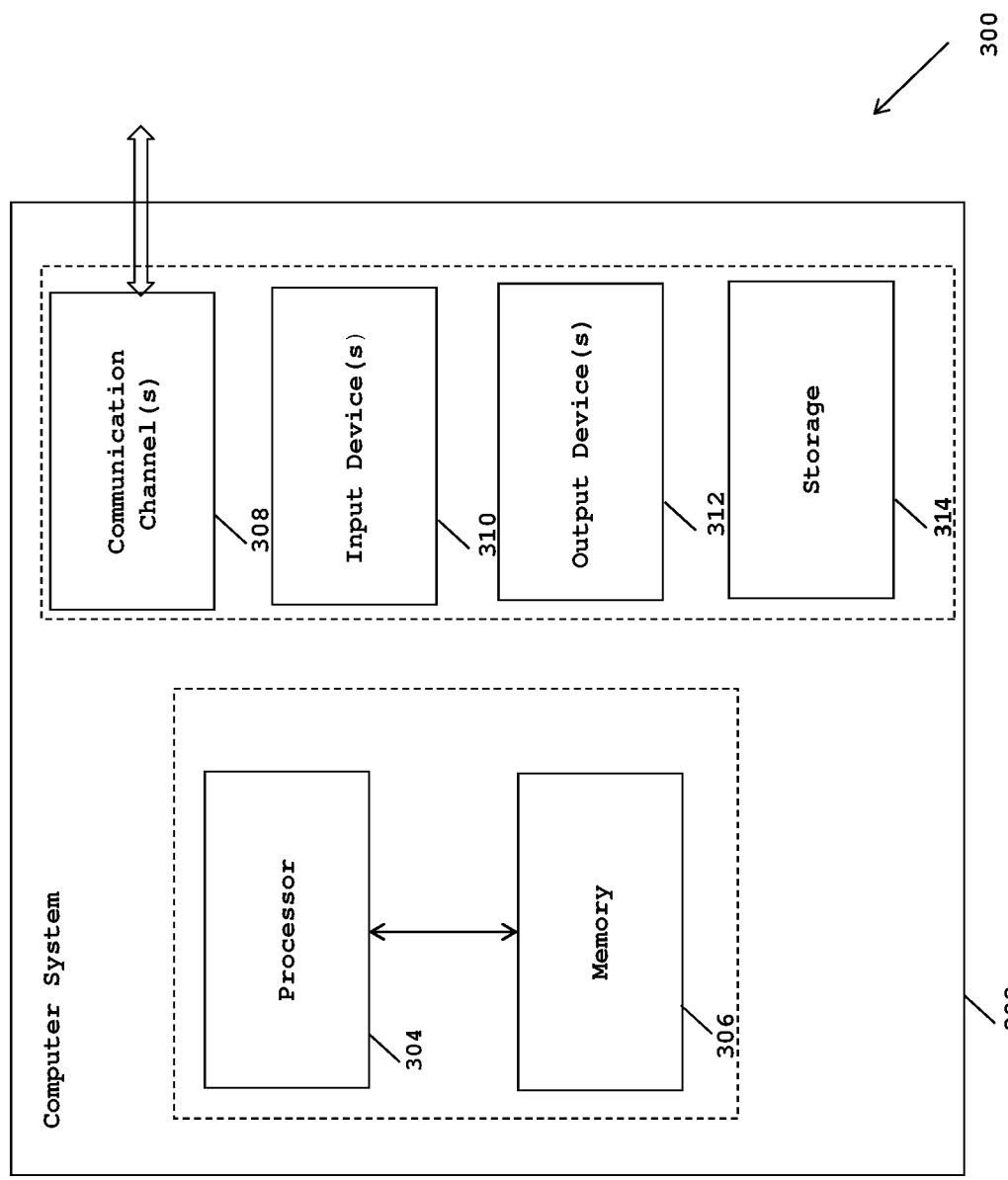
FIG. 3 illustrates an exemplary computer system in which various embodiments of the present invention may be implemented.

FIG. 3 illustrates an exemplary computer system in which various embodiments of the present invention may be implemented. The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A method for developing a tool for resource data classification and management, wherein the method is implemented by at least one processor executing program instructions stored in a memory, the method comprising:
    evaluating, by the processor, deployment probability scores of a plurality of incoming data-records, wherein the evaluation comprises creating one or more rules to analyse and extract information from the plurality of incoming data-records based on a plurality of previous data-records maintained throughout a predefined duration of time using an extreme gradient boosting machine learning technique, and wherein the extracted information comprises details associated with bench period of one or more years for each of the incoming data records;
    computing, by the processor, a match score of the plurality of incoming data-records in relation to one or more vacancy records, wherein each of the plurality of incoming data-records and the one or more vacancy records are analysed using a first set of rules;
    determining, by the processor, a bench period associated with each of the plurality of incoming data-records, wherein the bench period is a period for which the incoming data-record is set to hold due to unavailability of vacancy and lack of skills; and
    categorizing, by the processor, the plurality of incoming data-records based on a combination of the evaluated deployment probability scores, the computed match score and the bench period for generating a deployment opportunity index for managing resource data, wherein match score corresponding to each of the incoming data records received from a third party server is additionally included for categorizing the plurality of incoming data-records, and wherein the deployment opportunity index is updated based on a change in the bench period.

2. The method as claimed in claim 1, wherein each of the plurality of previous data-records and the plurality of incoming data-records comprise details related to a plurality of parameters, wherein said parameters are selected to include information associated with at least demographics, performance history, and utilization history of resource.

3. The method as claimed in claim 2, wherein the plurality of parameters include name, grade, location, region, latest rating, previous year rating, rating prior to previous year, time since last promotion, utilization in current role, utilization in previous role, billability status, previous role type, technical skills, historical median time taken to fit a vacancy record, and current demand for existing data record.

4. The method as claimed in claim 1, wherein the one or more vacancy records are associated with existing vacancy in the organization, said one or more vacancy records are retrieved from a vacancy database, further wherein each vacancy record comprises information associated with job role technical skills, grade, location, and region.

5. The method as claimed in claim 1, wherein the match score is representative of acceptability of the incoming data-records for one or more vacancy records associated with corresponding vacancies in the organization.

6. The method as claimed in claim 1, wherein the first set of rules comprises: (a) computing a percentage of commonality between the incoming data-record and the vacancy record, wherein the percentage of commonality is computed by determining and analysing skills that are common in the incoming data-record and the vacancy records; (b) computing a proficiency in the determined common skills for the incoming data-records; (c) computing skill adjacency between the incoming data-record and the vacancy record, wherein the skill adjacency is computed by determining similarity between skills of the incoming data-record and the vacancy record; (d) mapping location, grade and region details of the incoming data-record with the vacancy data record; (e) computing the match score of the incoming data-record based on corresponding percentage of commonality, proficiency, skill adjacency, along with location, grade and region details, wherein the data-record having a better combination of percentage of commonality, proficiency, skill adjacency, location, grade and region details has a high match score; and (f) repeating steps (a)-(e) for each incoming data-record.

7. The method as claimed in claim 1, wherein each of the plurality of incoming data-records are categorized into four categories, wherein the incoming data-records having a high deployment probability score, a match score of more than 70% and a bench period ranging between 0-29 days are categorized as easily deployable incoming data-records; the incoming data-records having a high deployment probability score, a match score of 40-70% and a bench period ranging between 0-29 days are categorized as moderately deployable data-records; the incoming data-records having a low deployment probability score, a match score of 40-70% and a bench period ranging between 0-29 days are categorized as the data-records requiring reskilling or upskilling; and the incoming data-records having a low deployment probability score, a match score of less than 40% and a bench period ranging between 0-29 days are categorized as data-records requiring reskilling intervention.

8. The method as claimed in claim 1, wherein the deployment opportunity index is generated for each of the incoming data-records, the deployment opportunity index representing the categories and corresponding probability score, match score and bench period associated with each of the plurality incoming data-records.

9. The method as claimed in claim 1, wherein a list of recommendations are generated for each incoming data-record based on the corresponding category.

10. A system for developing a tool for resource data classification and management, the system comprising:
   a memory storing program instructions;
   a processor configured to execute program instructions stored in the memory; and
   deployment opportunity evaluation engine in communication with the processor and configured to:
   evaluate deployment probability scores of a plurality of incoming data-records, wherein the evaluation comprises creating one or more rules to analyse and extract information from the plurality of incoming data-records based on a plurality of previous data-records maintained throughout a predefined duration of time using an extreme gradient boosting machine learning technique, and wherein the extracted information comprises details associated with bench period of one or more years for each of the incoming data records;
   compute a match score of the plurality of incoming data-records in relation to one or more vacancy records, wherein each of the plurality of incoming data-records and the one or more vacancy records are analysed using a first set of rules;
   determine a bench period associated with each of the plurality of incoming data-records, wherein the bench period is a period for which the incoming data-record is set to hold due to unavailability of vacancy and lack of skills; and
   categorize the plurality of incoming data-records based on a combination of the evaluated deployment probability score, the computed match score and the bench period for generating a deployment opportunity index for managing resource data, wherein match score corresponding to each of the incoming data records received from a third party server is additionally included for categorizing the plurality of incoming data-records, and wherein the deployment opportunity index is updated based on a change in the bench period.

11. The system as claimed in claim 10, wherein each of the plurality of previous data-records and the plurality of incoming data-records comprise details related to a plurality of parameters, wherein said parameters are selected to include information associated with at least demographics, performance history, and utilization history of resource.

12. The system as claimed in claim 11, wherein the plurality of parameters include name, grade, location, region, latest rating, previous year rating, rating prior to previous year, time since last promotion, utilization in current role, utilization in previous role, billability status, previous role type, technical skills, historical median time taken to fit a vacancy record, and current demand for existing data record.

13. The system as claimed in claim 10, wherein the one or more vacancy records associated with existing vacancy in the organization are retrieved from a vacancy database, further wherein each vacancy record comprises information associated with job role technical skills, grade, location, and region.

14. The system as claimed in claim 10, wherein the match score is representative of acceptability of the incoming data-records for one or more vacancy records associated with corresponding vacancies in the organization.

15. The system as claimed in claim 10, wherein the first set of rules comprises: (a) computing a percentage of commonality between the incoming data-record and the vacancy record, wherein the percentage of commonality is computed by determining and analysing skills that are common in the incoming data-record and the vacancy records; (b) computing a proficiency in the determined common skills for the incoming data-records; (c) computing skill adjacency between the incoming data-record and the vacancy record, wherein the skill adjacency is computed by determining similarity between skills of the incoming data-record and the vacancy record; (d) mapping location, grade and region details of the incoming data-record with the vacancy data record; (e) computing the match score of the incoming data-record based on corresponding percentage of commonality, proficiency, skill adjacency, along with location, grade and region details, wherein the data-record having a better combination of percentage of commonality, proficiency, skill adjacency, location, grade and region details has a high match score; and (f) repeating steps (a)-(e) for each incoming data-record.

16. The system as claimed in claim 10, wherein each of the plurality of incoming data-records are categorized into four categories, wherein the incoming data-records having a high deployment probability score, a match score of more than 70% and a bench period ranging between 0-29 days are categorized as easily deployable incoming data-records; the incoming data-records having a high deployment probability score, a match score of 40-70% and a bench period ranging between 0-29 days are categorized as moderately deployable data-records; the incoming data-records having a low deployment probability score, a match score of 40-70% and a bench period ranging between 0-29 days are categorized as the data-records requiring reskilling or upskilling; and the incoming data-records having a low deployment probability score, a match score of less than 40% and a bench period ranging between 0-29 days are categorized as data-records requiring reskilling intervention.

17. The system as claimed in claim 10, wherein the deployment opportunity index is generated for each of the incoming data-records, the deployment opportunity index representing the categories and corresponding probability score, match score and bench period associated with each of the plurality incoming data-records.

18. The system as claimed in claim 10, wherein a list of recommendations are generated for each incoming data-record based on the corresponding category.

19. A computer program product comprising: a non-transitory computer-readable medium having computer-readable program code stored thereon, the computer-readable program code comprising instructions that, when executed by a processor, cause the processor to:
   evaluate deployment probability scores of a plurality of incoming data-records, wherein the evaluation comprises creating one or more rules to analyse and extract information from the plurality of incoming data-records based on a plurality of previous data-records maintained throughout a predefined duration of time using an extreme gradient boosting machine learning technique, and wherein the extracted information comprises details associated with bench period of one or more years for each of the incoming data records;
   compute a match score of the plurality of incoming data-records in relation to one or more vacancy records, wherein each of the plurality of incoming data-records and the one or more vacancy records are analysed using a first set of rules;

determine a bench period associated with each of the plurality of incoming data-records, wherein the bench period is a period for which the incoming data-record is set to hold due to unavailability of vacancy and lack of skills; and
categorize the plurality of incoming data-records based on a combination of the evaluated deployment probability score, the computed match score and the bench period for generating a deployment opportunity index for managing resource data, wherein match score corresponding to each of the incoming data records received from a third party server is additionally included for categorizing the plurality of incoming data-records, and wherein the deployment opportunity index is updated based on a change in the bench period.

* * * * *